(12) United States Patent
Ding et al.

(10) Patent No.: US 7,787,410 B2
(45) Date of Patent: Aug. 31, 2010

(54) COMMUNICATION WITHIN A WIRELESS NETWORK USING MULTIPLE SIGNAL TRANSMISSION POWERS

(75) Inventors: Gang Ding, Lafayette, IN (US); Sanjay Rungta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1093 days.

(21) Appl. No.: 11/443,614

(22) Filed: May 30, 2006

(65) Prior Publication Data

US 2007/0280148 A1 Dec. 6, 2007

(51) Int. Cl.
H04B 7/185 (2006.01)
H04B 7/212 (2006.01)

(52) U.S. Cl. ...................... 370/318; 370/348
(58) Field of Classification Search .............. 370/329, 370/318, 345, 347, 348
See application file for complete search history.

(56) References Cited

U.S. PATENT DOCUMENTS

| | | | |
|---|---|---|---|
| 2002/0172186 A1* | 11/2002 | Larsson | 370/349 |
| 2003/0184433 A1* | 10/2003 | Zalitzky et al. | 340/310.06 |
| 2005/0058151 A1* | 3/2005 | Yeh | 370/445 |
| 2005/0135242 A1* | 6/2005 | Larsen et al. | 370/229 |
| 2005/0245237 A1* | 11/2005 | Adachi et al. | 455/411 |
| 2006/0040709 A1* | 2/2006 | Adachi et al. | 455/562.1 |
| 2008/0144493 A1* | 6/2008 | Yeh | 370/230 |

OTHER PUBLICATIONS

Ding et al., "Capacity of Ultra Wide Band Ad Hoc Networks," Dec. 2005, Intel Technical Report, pp. 1-19.
Gupta et al., "The Capacity of Wireless Networks," IEEE Transactions on Information Theory, vol. 46, No. 2, Mar. 2000, pp. 388-404.
Negi et al., "Capacity of Power Constrained Ad-Hoc Networks," IEEE INFOCOM 2004, 11 pgs.
Win et al., "Ultra-Wide Bandwidth Time-Hopping Spread-Spectrum Impulse Radio for Wireless Multiple-Access Communications," IEEE Transactions on Communication, vol. 48, No. 4, Apr. 2000, pp. 679-691.
Zhang et al., "Capacity of Wireless Ad-Hoc Networks Under Ultra Wide Band with Power Constraint," IEEE, 2005, pp. 455-465.

* cited by examiner

*Primary Examiner*—George Eng
*Assistant Examiner*—Christopher M Brandt
(74) *Attorney, Agent, or Firm*—Schwabe, Williamson & Wyatt, P.C.

(57) ABSTRACT

A new communication protocol based on a new physical interference model, and apparatuses and systems for implementing such protocols are described herein. The new communication protocol may be a new medium access control (MAC) protocol for a wireless network that uses different signal transmission powers for transmitting and receiving various MAC protocol packets.

19 Claims, 3 Drawing Sheets

COMMUNICATION WITHIN A WIRELESS NETWORK USING MULTIPLE SIGNAL TRANSMISSION POWERS

TECHNICAL FIELD

Embodiments of the present invention relate to the field of electronic communication, more specifically, to communication within wireless networks.

BACKGROUND

Based on the current physical interference model of wireless networks such as ultra wide band (UWB) ad hoc networks, the number of concurrent transmission of signals by nodes within a wireless network are strictly limited by the topography (i.e., density and locations of the nodes) of the ad hoc wireless network and the maximum signal transmission ranges of the nodes. As used herein "ad hoc networks" may refer to any type of wireless networks including, for example, personal area networks (PANs), wireless local area networks (WLAN), and so forth. Some of the limitations of the current physical interference model of wireless networks are illustrated by the following example.

Consider a wireless network having six nodes, A, B, C, D, E, and F located at different geographical locations. When one of the nodes, node A, is to transmit data packets to another node, node B, nodes within the areas covered by the transmission ranges of nodes A and B will not be allowed to transmit and/or receive messages to or from other nodes, depending upon the location of node in the area covered by the transmission ranges of nodes A and B. The area covered by the transmission range of transmitting node A may be referred to as reception exclusive space (RES), whereas the area within the transmission range of receiving node B may be referred to as the transmission exclusive space (TES). The area within the intersection of the RES and TES may be referred to as the communication exclusive space (CES).

So, when node A is transmitting data packets to node B, any node within the RES will not be allowed to receive signals from other nodes of the wireless network, while any node within the TES will not be allowed to transmit signals to other nodes of the wireless network. Further, when node A is transmitting data packets to node B, any node within the CES (i.e., other than nodes A and B) will not be allowed to either transmit or receive signals from other nodes.

So if nodes C and E are located in the RES and TES respectively, nodes C and E are limited, at least in part, from fully communicating with other nodes of the wireless network, when node A is transmitting data packets to node B. That is, when node A is transmitting data packets to node B, node C, in RES, may not receive signals from, e.g., node D, even if node D is proximally located near node C outside the RES. However, node C may transmit signals to node D. In contrast, node E may not transmit signals to, e.g., node F, even if node F is proximally located near node E outside the TES. But, node E may receive signals from node F.

Because of the relatively large exclusive spaces that are needed under the current physical interference model, the overall data throughput of the wireless network is very limited, particularly if the network is densely populated with nodes.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
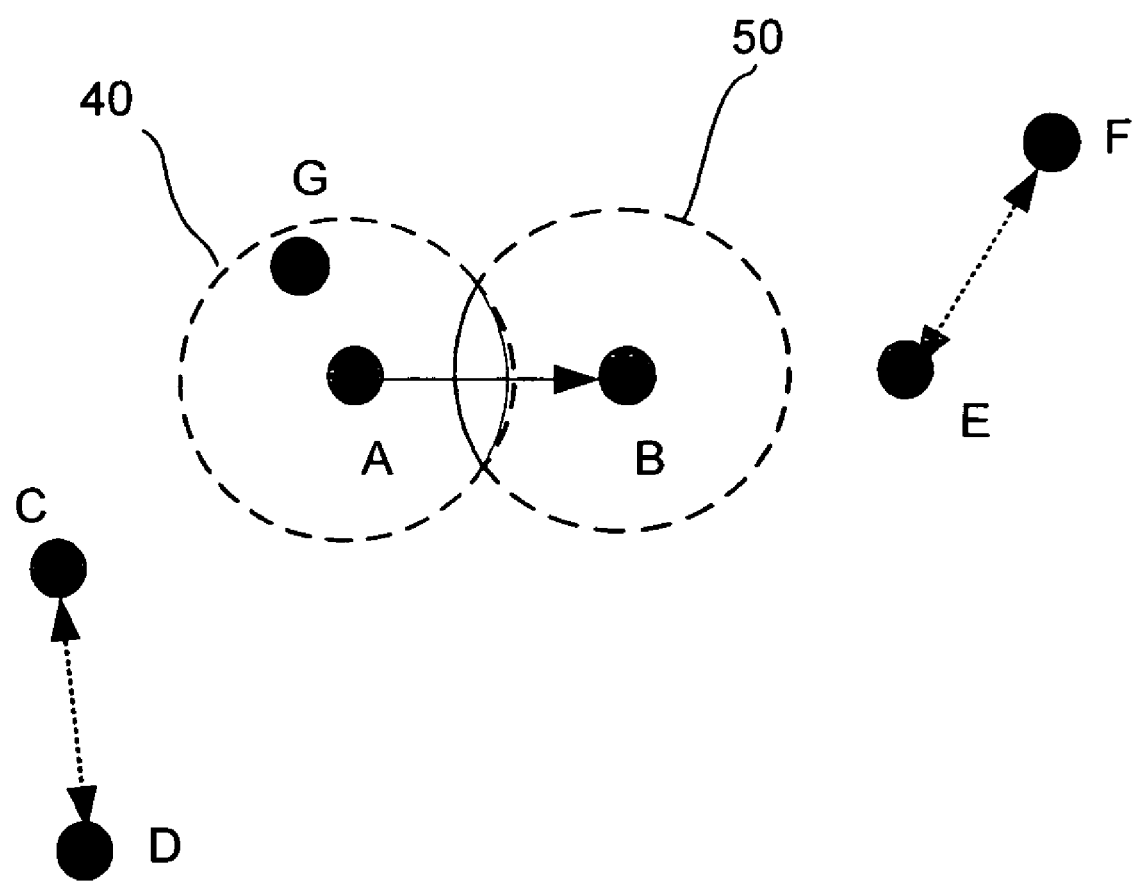
FIG. 1 illustrates reduced exclusive spaces that are needed in a wireless network when two nodes of the wireless network are communicating data packets in accordance with various embodiments of the present invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "at least one of A, B and C" rheans "(A), (B), (C), (A and B), (A and C), (B and C) or (A, B and C)." For the purposes of the present invention, the phrase "(A)B" means "(B) or (AB)," that is, A is an optional element. The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiments of the present invention, a new communication protocol based on a new physical interference model, and apparatuses and systems for implementing such protocols are provided. For the embodiments, the new communication protocol may be a new medium access control (MAC) protocol for a wireless network that allows a greater number of nodes within the wireless network to concurrently communicate with each other, and a greater overall data throughput for the wireless network. The wireless network may be an UWB ad hoc network, a code division multiple access (CDMA) network, or other type of network.

The new physical interference model allows for a smaller or even zero sized CES needed by two nodes of a wireless network to communicate with each other. By reducing the size of the CES or completely eliminating the CES, the size of the RES and the TES may also be substantially reduced. The new physical interference model recognizes that a large CES (as well as RES and TES), such as those required by the old physical model, are not needed for wireless networks, particularly for wireless networks such as UWB ad hoc networks. This is, at least in part, due to several factors including, for example, radio propagation path loss (i.e., signal attenuation), signal-to-interference-plus-noise ratio (SINR) factors, signal decoding factors, and so forth, that are specific to particular types of wireless networks such as UWB ad hoc networks. The new physical interference model thus allows for a smaller or even zero communication exclusive space (CES) needed by two nodes of a wireless network to communicate with each other.

FIG. 1 depicts several nodes of a wireless network with reduced or no exclusive spaces based on the new physical interference model in accordance with various embodiments of the present invention. As depicted, the wireless network includes nodes A, B, C, D, E, F, and G, each of the nodes represented by the black dots. Based on the new physical interference model, when node A is to transmit data packets to node B, the RES (i.e., circle 40) and the TES (i.e., circle 50) that are required for the data packet transmission are significantly smaller than the RES and the TES required under the old physical interference model (see FIG. 1) while the CES may be essentially eliminated. As a result, a smaller number of neighboring nodes are affected when node A is to communicate with node B.

Because of the relatively small RES and TES and the absence of the CES, nodes C and D and nodes E and F as depicted can freely communicate (i.e., both transmit and receive signals) with each other even when node A is transmitting data packets to node B. The only node unable to communicate, at least in part, with other nodes is node G, which is within the RES (i.e., circle 40). Because node G is in the RES, node G although able to transmit signals to other nodes of the wireless network is unable to receive signals from other nodes while node A is transmitting data packets to node B. That is, while node A is transmitting data packets to node B, node G may be able to transmit signals to, for example, node C but will not be able to receive signals from node C. Similarly, if node G was within the TES (i.e., circle 50), node G, although able to receive signals from other nodes, would not be able to transmit signals to the other nodes while node A is transmitting data packets to node B.

In various embodiments, if the wireless network is an UWB ad hoc network then the distance between the communicating devices (i.e., nodes A and B) may be between about 1 meter and about 10 meters. In alternative embodiments, where the wireless network is another type of a network (e.g., CDMA network), the distance between the communicating devices (i.e., nodes A and B) may be less than or greater than between about 1 meter and about 10 meters.

Based on the new physical interference model, a new communication protocol for a wireless network is provided in accordance with various embodiments of the present invention. The new communication protocol may be a new MAC protocol, which allows more nodes within a wireless network to concurrently communicate with each other. As a result, the overall data throughput of the wireless network may be significantly increased. In some embodiments, the new protocol calls for a new way to send and receive, for example, ready-to-send/clear-to-send (RTS/CTS) packets using multiple signal transmission powers.

Figure 2:
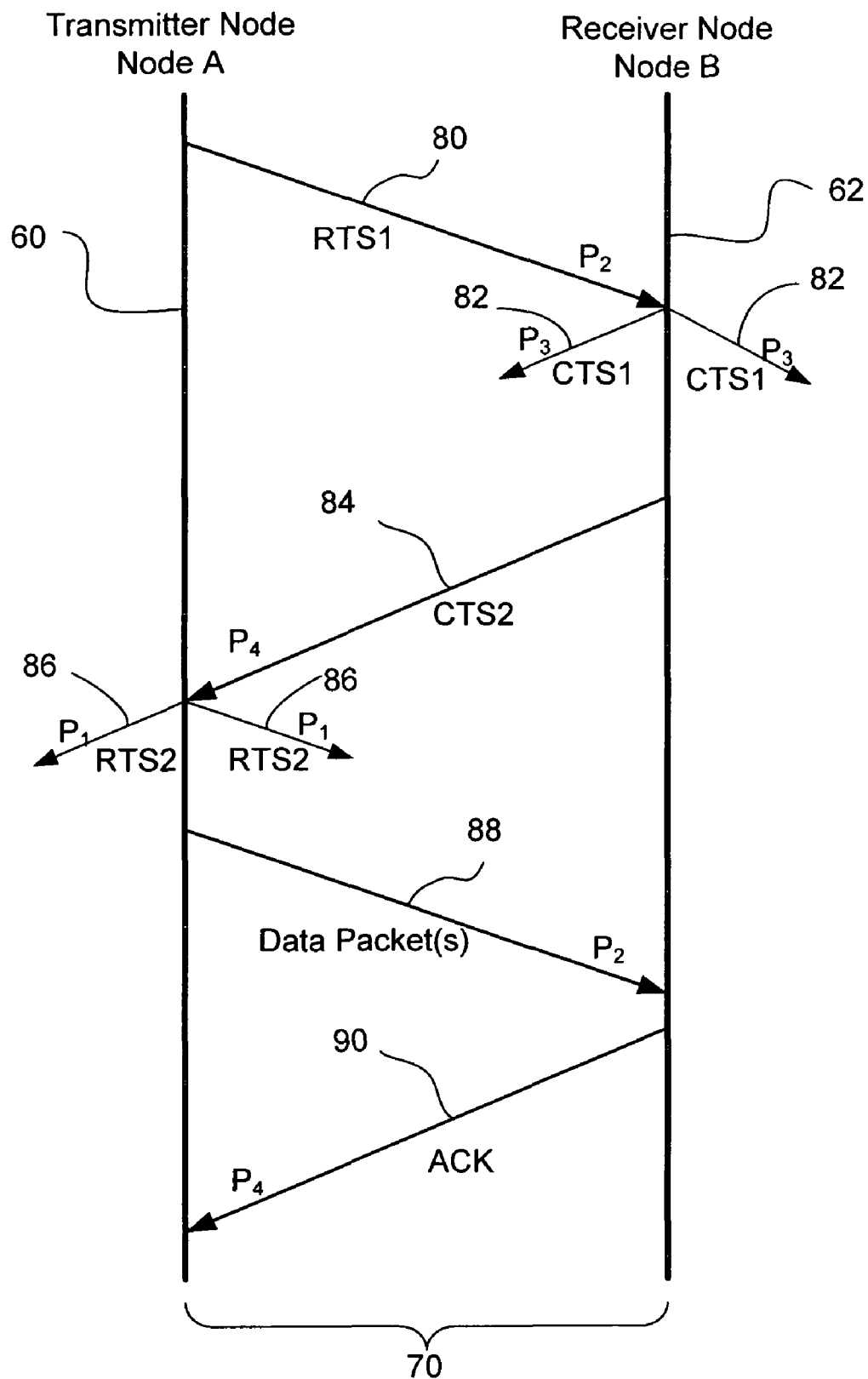
FIG. 2 illustrates a new communication protocol of a wireless network in accordance with various embodiments of the present invention.

FIG. 2 depicts how node A and node B of FIG. 1 may send and receive various communication packets (i.e., RTS and CTS packets) using different signal transmission powers (herein "transmission powers") in order for node A to transmit one or more data packets to node B, in accordance with various embodiments. As illustrated, node A is represented by bold line 60 and is the transmitter node while node B is represented by bold line 62 and is the receiver node. The space 70 between bold line 60 and bold line 62 represents the distance between node A and node B in FIG. 1.

In various embodiments, node A may be adapted to transmit signals using a first transmission power $P_1$ or a second transmission power $P_2$, wherein $P_1$ is a lower transmission power than $P_2$. In some embodiments, $P_2$ may be the maximum transmission power of node A. Similarly, node B may be adapted to transmit signals using a third transmission power $P_3$ or a fourth transmission power $P_4$, wherein $P_3$ is a lower transmission power than $P_4$. In some embodiments, $P_4$ may be the maximum transmission power of node B. Further, in the same or alternative embodiments, $P_1$ may be substantially equal to $P_3$, while $P_2$ may be substantially equal to $P_4$.

In accordance with various embodiments, $P_1$ may be defined by the following equation:

$$P_1 = P_2(1+\Delta)^\alpha$$

where, $$\Delta = \left(\frac{\sigma^2}{m^2}\beta N_u R\right)^{\frac{1}{\alpha}} - 1 < 0;$$

$$\sigma^2 = \int_{-\infty}^{\infty}\left[\int_{-\infty}^{\infty} w(t-\tau)\cdot(w(t)-w(t-\delta))dt\right]^2 d\tau;$$

$$m = \int_{-\infty}^{\infty} w(t-\delta)\cdot(w(t)-w(t-\delta))dt;$$

w(t) is the waveform function for each ultra wide band impulse, and δ is the phase shift;

β is the threshold for SINR above which a packet can be successfully received;

$N_u$ is the number of neighboring nodes that are also transmitting;

$R=1/(N_s T_f)$ is the data transmission rate;

$N_s$ is the number of impulses per bit;

$T_f$ is the impulse repetition interval; and

α is the path loss exponent due to wireless radio transmission.

For the embodiments, $P_3$ may be similarly defined and may have a similar relationship to $P_4$ (i.e., $P_3=P_4(1+\Delta)^\alpha$). Note that the definition of delta (Δ) as provided above relates to specific types of networks such as UWB networks but may be defined differently for other types of networks such as CDMA networks.

In order for node A to transmit one or more data packets to node B, node A may initially transmit a signal that may include a first RTS packet to node B using the second transmission power $P_2$ (which is a higher transmission power than $P_1$) as indicated by arrow 80. The first RTS packet may indicate to node B that node A wishes to transmit one or more data packets to node B.

Upon receiving the first RTS packet, node B may check to see if it is allowed to receive data packets (it may not be ready to receive packets if it is transmitting or receiving packets from other nodes, of if a nearby neighboring node is transmitting or receiving packets). If node B is ready to receive the data packets, then it may, in response to the first RTS packet, be prompted to transmit or broadcast a signal containing a first CTS packet using the third transmission power $P_3$ (which is a lower transmission power than $P_4$) as indicated by short arrows 82 to indicate to the other nodes of the wireless network receiving the first CTS packet that they are not allowed to communicate, at least in part, with other nodes of the wireless network for a certain time period. In some embodiments, this means that the nodes receiving the first CTS packet will cease at least the transmission of signals to other nodes of the wireless network at least until node A has finished transmitting the one or more data packets to node B. Note that there are two short arrows 82 to indicate that the signal is being broadcasted in multiple directions.

Because the first CTS packet is transmitted or broadcasted using a relatively low transmission power (i.e., $P_3$), only those nodes that are relatively close to node B will receive the first CTS packet. Therefore, only those nodes that are relatively close to node B will cease, at least in part, communication with other nodes at least until node A has finished transmitting the data packets to node B. Furthermore, because $P_3$ is a relatively low transmission power, the first CTS packet is not received by node A.

Following the transmission of the first CTS packet and in further response to the first RTS packet received by node B, node B may then be further prompted to transmit a second CTS packet using the fourth transmission power $P_4$ as indicated by arrow 84. Because $P_4$ is a higher transmission power than $P_3$, the second CTS packet reaches node A indicating to node A that it is clear to send the data packets. In response to the second CTS packet, node A may transmit or broadcast a signal containing a second RTS packet using the first transmission power $P_1$ (which is a lower transmission power than $P_2$) as indicated by short arrows 86 to indicate to the other nodes of the wireless network receiving the second RTS packet that they are to cease communication, at least in part, until node A has finished transmitting a signal containing the one or more data packets to node B. In some embodiments, this means that the nodes receiving the second RTS packet cease at least the reception of signals from other nodes of the wireless network at least until node A has finished transmitting the one or more data packets to node B.

Because the first transmission power $P_1$ used to transmit the second RTS is relatively low, only those nodes near node A (i.e., only those nodes within the transmission range using first transmission power $P_1$) will receive the second RTS packet. Consequently, only those nearby nodes will cease, at least In part, communication with other nodes of the wireless network for a certain time period. In some embodiments, this means that the nodes receiving the second RTS packet cease at least the reception of signals from other nodes of the wireless network at least until node A has finished transmitting the data packets to node B.

After transmitting the second RTS packet, node A may then transmit signal or signals containing the one or more data packets to node B using the second transmission power $P_2$ as indicated by arrow 88. After receiving the data packets, node B may then transmit a signal containing an acknowledgement (ACK) packet to node B using the fourth transmission power $P_4$ as indicated by arrow 90.

Although node A in the above example is described as being a transmitter node and node B is described as a receiver node, in various alternative embodiments, each of these nodes may be both a transmitter node and a receiver node. Thus, in some embodiments, node A in addition to transmitting the first and the second RTS packets as the transmitter node as previously described may also transmit first and second CTS packets as a receiver node. Similarly, node B in addition to transmitting the first and the second CTS packets as the receiver node as previously described may also transmit first and second RTS packets as a transmitter node.

In alternative embodiments, a busy tone may be employed instead of the RTS/CTS dialog described above when two communication channels are employed (a first channel for control information packets and a second channel for data packets). In such a scenario, a busy tone may be transmitted through the first channel using, for example, the first transmission power $P_1$ in order to reserve the second channel for transmitting data packets using the second transmission power $P_2$.

Figure 3:
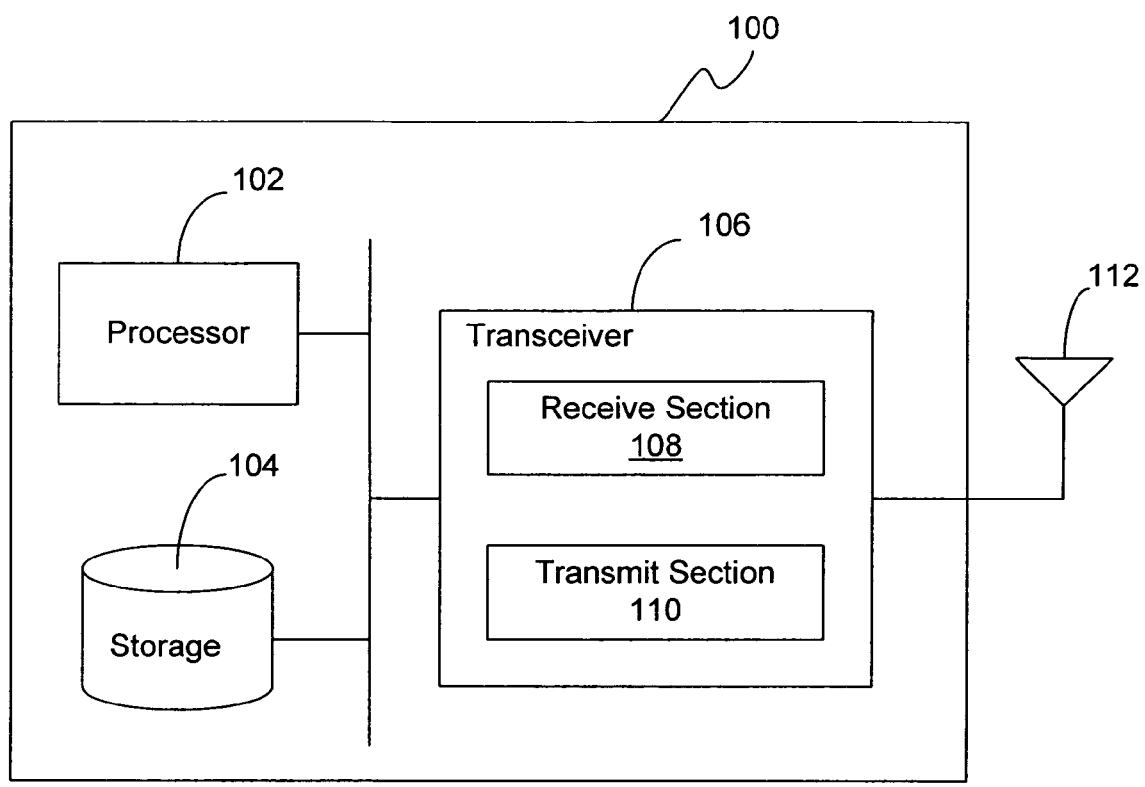
FIG. 3 illustrates a system in accordance with various embodiments of the present invention.

FIG. 3 depicts a system adapted to transmit and/or receive signals containing various data, RTS, and/or CTS packets using different transmission powers as previously described in accordance with various embodiments of the present invention. For the embodiments, the system 100 may be a node of a wireless network having various form factors including, for example, a desktop computer, a laptop computer, a set-top box, a personal digital assistant (PDA), a web tablet, a pager, a text messenger, a game device, a smart appliance, a wireless mobile phone or any other type of computing or communication device. The system 100 may host or include a processor 102, a physical storage medium 104, a transceiver 106 that further includes a receive section 108 and a transmit section 110, and an antenna 112, coupled together as shown. In some embodiments, the antenna 112 may be an omnidirectional antenna.

If the system 100 is a node of a wireless network, the processor 102 along with the physical storage medium 104 may be employed to control the transceiver 106 to enable the transceiver 106 to transmit and/or receive signals containing various MAC protocol packets including data, RTS, and/or CTS packets. For example, the physical storage medium 104 may include instructions to be executed by the processor 102 and designed to program or control the transceiver 106 to transmit and/or receive various signals that are transmitted or received using multiple signal transmission powers. Alternatively, in some alternative embodiments, such instructions may be remotely located to be wirelessly accessed when needed. In some embodiments, the instructions stored in the physical storage medium 104 may include a first set of instructions designed to program the transceiver 106 to enable the transceiver 106 to transmit a first signal using a first transmission power ($P_1$). The first signal may indicate to nodes of the wireless network receiving the first signal to cease communication, at least in part, until the system 100 (i.e., first node) has finished communicating with a second node of the wireless network. In order for the system 100 to communicate with the second node, the first set of instructions may further include instructions that enable the transceiver 106 to transmit at least a second signal to the second node, the second signal being transmitted using a second transmission power ($P_2$), which is a greater transmission power than the first transmission power ($P_1$).

The instructions stored in the physical storage medium 104, in various embodiments, may further include a second set of instructions designed to program the transceiver 106 to enable the transceiver 106 to receive from a third node of the wireless network, a third signal to prompt the system 100 to transmit a fourth signal. The second set of instructions may further include instructions that enable the transceiver 106 to transmit the fourth signal using a third transmission power ($P_3$) to indicate to the nodes of the wireless network receiving the fourth signal to cease communication, at least in part, until the system 100 has finished communicating with the third node, the third transmission power ($P_3$) being a lower transmission power than a fourth transmission power ($P_4$) to be used by the transceiver 106 to transmit further communication (e.g., data packets) to the third node. In some embodiments, at least some of the first and second sets of instructions are common to both the first and the second sets of instructions.

In various embodiments, the transmit section 110 may be adapted to transmit for the host device (i.e., system 100)

signals containing various data, RTS and/or CTS packets using a first transmission power $P_1$ or a second transmission power $P_2$, wherein the first transmission power $P_1$ being a lower transmission power than the second transmission power $P_2$. The receive section 108, in contrast, may be adapted to receive for the host device various data, RTS, and/or CTS packets to be transmitted by other nodes of the wireless network.

The transmit section 110 and the receive section 108 may be employed in combination to facilitate communication of data packets with other nodes of the wireless network by exchanging various RTS and/or CTS packets using different power levels as previously described (see, for example, FIG. 2). For instance, in some embodiments, the receive section 108 may be adapted to receive from another node of the wireless network a first signal that may contain an RTS or a CTS packet from the other node to prompt the system 100 to transmit a second signal that may itself include a CTS or an RTS packet. That is, if the first signal received by the system 100 contains an RTS packet from the other node, then the system 100 using the transmit section 110 may be prompted to transmit a second signal containing a CTS packet. On the other hand, if the first signal received by the system 100 contains a CTS packet from the other node, then the system 100 using the transmit section 110 may be prompted to transmit a second signal containing an RTS packet. The second signal may be transmitted using a first transmission power ($P_1$) to indicate to nodes of the wireless network receiving the second signal to cease at least transmission or reception of signals at least until the system 100 has finished communicating with the other node, the first transmission power ($P_1$) being a lower transmission power than a second transmission power ($P_2$) that is to be used by the system 100 to communicate with the other node.

In some embodiments, the transmit section 110 may be further adapted to transmit to the other node a third signal using the second transmission power ($P_2$), the third signal including a second CTS or a second RTS packet depending upon whether the second signal included a CTS or an RTS packet. In some embodiments, where the third signal includes a second CTS packet, the receive section 108 may be further adapted to receive, subsequent to the transmission of the third signal, a fourth signal from the other node, the fourth signal including one or more data packets. In some embodiments, where the third signal includes a second RTS packet, the transmit section 110 may be further adapted to transmit, subsequent to the transmission of the third signal, a fourth signal to the other node using the second transmission power ($P_2$), the fourth signal including one or more data packets.

In various embodiments, the ability for transceiver 106 to operate as earlier described may be implemented with hardware integrated with the transceiver 106. In still other embodiments, the transceiver 106 may be implemented as separate transmitter and receiver.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
transmitting on behalf of a first device of a wireless network a first signal using a first transmission power ($TP_1$) to indicate to other devices of the wireless network receiving the first signal to cease communication at least in part until the first device has finished communicating with a second device of the wireless network;
transmitting on behalf of the first device to communicate with the second device, at least a second signal using a second transmission power ($TP_2$), the second transmission power being greater than the first transmission power; and
wherein the first transmission power ($TP_1$) is defined by $$TP_1 = TP_2(1 + \Delta)^\alpha$$

wherein, $$\Delta = \left(\frac{\sigma^2}{m^2}\beta N_u R\right)^{\frac{1}{\alpha}} - 1 < 0;$$

$$\sigma^2 = \int_{-\infty}^{\infty}\left[\int_{-\infty}^{\infty} w(t-\tau)\cdot(w(t) - w(t-\delta))dt\right]^2 d\tau;$$

$$m = \int_{-\infty}^{\infty} w(t-\delta)\cdot(w(t) - w(t-\delta))dt;$$

w(t) is waveform function for each ultra wide band impulse, and δ is the phase shift;
β is threshold for SINR above which a packet can be successfully received;
$N_u$ is number of neighboring nodes that are also transmitting;
$R=1/(N_s T_f)$ is data transmission rate;
$N_s$ is number of impulses per bit;
$T_f$ is impulse repetition interval; and
α is the path loss exponent due to wireless radio transmission.

2. The method of claim 1, wherein the first signal's transmission power ($TP_1$) is selected to cause the first signal not to be received by the second device.

3. The method of claim 1, wherein said transmitting of the first signal comprises transmitting the first signal including a request-to-send (RTS) packet.

4. The method of claim 3, wherein said transmitting of the first signal comprises transmitting the first signal using a first transmission power ($TP_1$) in response to a third signal received from the second device, the third signal including a clear-to-send (CTS) packet.

5. The method of claim 4, further comprising prior to said transmitting of the first signal, transmitting a fourth signal to the second device to at least in part prompt the second device to transmit said third signal, said fourth signal including another RTS packet.

6. The method of claim 1, wherein said transmitting of at least a second signal comprises transmitting at least the second signal including one or more data packets.

7. The method of claim 1, wherein said transmitting of the first signal comprises transmitting using the first transmission power ($TP_1$) to indicate to other devices of the wireless network receiving the first signal to cease reception of signals at least until the first device has finished communicating with the second device of the wireless network.

8. An apparatus, comprising:
a receive section to receive for a first device hosting the apparatus, from a second device of a wireless network, a first signal to prompt the first device to transmit a second signal; and
a transmit section to transmit for the hosting first device the second signal using a first transmission power ($TP_1$) to indicate to other devices of the wireless network receiving the second signal to cease communication among the other devices at least in part until the hosting first device has finished communicating with the second device of the wireless network, the first transmission power ($TP_1$) being a lower transmission power than a second transmission power ($TP_2$) to be used by the first device to communicate with the second device,
wherein the first transmission power ($TP_1$) is defined by $$P_1 = P_2(1+\Delta)^\alpha$$

where, $$\Delta = \left(\frac{\sigma^2}{m^2}\beta N_u R\right)^{\frac{1}{\alpha}} - 1 < 0;$$

$$\sigma^2 = \int_{-\infty}^{\infty}\left[\int_{-\infty}^{\infty} w(t-\tau)\cdot(w(t)-w(t-\delta))dt\right]^2 d\tau;$$

$$m = \int_{-\infty}^{\infty} w(t-\delta)\cdot(w(t)-w(t-\delta))dt;$$

w(t) is waveform function for each ultra wide band impulse, and δ is the phase shift;
β is threshold for SINR above which a packet can be successfully received;
$N_u$ is number of neighboring nodes that are also transmitting;
$R=1/(N_s T_f)$ is data transmission rate;
$N_s$ is number of impulses per bit;
$T_f$ is impulse repetition interval; and
α is the path loss exponent due to wireless radio transmission.

9. The apparatus of claim 8, wherein the transmit section is adapted to transmit the second signal, including a clear-to-send (CTS) packet.

10. The apparatus of claim 9, wherein the transmit section is further adapted to transmit a third signal using the second transmission power ($TP_2$) to the second device, the third signal including another clear-to-send (CTS) packet.

11. The apparatus of claim 10, wherein the receive section is further adapted to receive subsequent to said transmit of the third signal, a fourth signal from the other device, the fourth signal including one or more data packets.

12. The apparatus of claim 8, wherein the receive section is adapted to receive the first signal with a request-to send (RTS) packet.

13. The apparatus of claim 8, wherein the transmit section is adapted to transmit the second signal using the first transmission power ($TP_1$) to indicate to devices of the wireless network receiving the second signal to cease transmission of signals at least until the first device has finished communicating with the second device of the wireless network.

14. The apparatus of claim 8, wherein the receive and transmit sections together form a transceiver.

15. An article of manufacture, comprising:
a physical storage medium; and
a plurality of executable instructions stored in the physical storage medium, and designed to program a transceiver of a first device of a wireless network to enable the transceiver to:
transmit on behalf of the first device a first signal using a first transmission power ($TP_1$) to indicate to other devices of the wireless network receiving the first signal to cease communication at least in part until the first device has finished communicating with a second device of the wireless network; and
transmit on behalf of the first device, to communicate with the second device, at least a second signal using a second transmission power ($TP_2$), the second transmission power being greater than the first transmission power,
wherein the first transmission power ($TP_1$) is defined by $$P_1 = P_2(1+\Delta)^\alpha$$

where, $$\Delta = \left(\frac{\sigma^2}{m^2}\beta N_u R\right)^{\frac{1}{\alpha}} - 1 < 0;$$

$$\sigma^2 = \int_{-\infty}^{\infty}\left[\int_{-\infty}^{\infty} w(t-\tau)\cdot(w(t)-w(t-\delta))dt\right]^2 d\tau;$$

$$m = \int_{-\infty}^{\infty} w(t-\delta)\cdot(w(t)-w(t-\delta))dt;$$

w(t) is waveform function for each ultra wide band impulse, and δ is the phase shift;
β is threshold for SINR above which a packet can be successfully received;
$N_u$ is number of neighboring nodes that are also transmitting;
$R=1/(N_s T_f)$ is data transmission rate;
$N_s$ is number of impulses per bit;
$T_f$ is impulse repetition interval; and
α is the path loss exponent due to wireless radio transmission.

16. The article of manufacture of claim 15, further comprising second instructions stored in the storage medium and designed to program the transceiver to enable the transceiver to
receive on behalf of the first device from a third device of the wireless network a third signal to prompt the first device to transmit a fourth signal; and
transmit on behalf of the first device the fourth signal using a third transmission power ($TP_3$) to indicate to other devices of the wireless network receiving the fourth signal to cease communication at least in part until the first device has finished communicating with the third device, wherein the third signal's transmission power ($TP_3$) is selected to cause the third signal not to be received by the third device, the third transmission power ($TP_3$) being a lower transmission power than a fourth transmission power ($TP_4$) to be used by the transceiver to transmit further communication from the first device to the third device.

17. A system, comprising:
an omindirectional antenna;
a transceiver coupled to the antenna to selectively transmit and receive signals at various power levels;
a processor coupled to the transceiver to control the transceiver to:

transmit on behalf of the system a first signal using a first transmission power (TP$_1$) to indicate to other devices of the wireless network receiving the first signal to cease communication at least in part until the system has finished communicating with a first device of the wireless network; and transmit on behalf of the system, to communicate with the first device, at least a second signal using a second transmission power (TP$_2$), the second transmission power being greater than the first transmission power, wherein the first transmission power (TP$_1$) is defined by $$P_1 = P_2(1+\Delta)^\alpha$$

where, $$\Delta = \left(\frac{\sigma^2}{m^2}\beta N_u R\right)^{\frac{1}{\alpha}} - 1 < 0;$$

$$\sigma^2 = \int_{-\infty}^{\infty}\left[\int_{-\infty}^{\infty} w(t-\tau)\cdot(w(t)-w(t-\delta))dt\right]^2 d\tau;$$

$$m = \int_{-\infty}^{\infty} w(t-\delta)\cdot(w(t)-w(t-\delta))dt;$$

w(t) is waveform function for each ultra wide band impulse, and δ is the phase shift;

β is threshold for SINR above which a packet can be successfully received;

N$_u$ is number of neighboring nodes that are also transmitting;

R=1/(N$_s$T$_f$) is data transmission rate;

N$_s$ is number of impulses per bit;

T$_f$ is impulse repetition interval; and

α is the path loss exponent due to wireless radio transmission.

18. The system of claim 17, wherein said processor is further adapted to control the transceiver to:

receive on behalf of the system from a second device of the wireless network a third signal to prompt the system to transmit a fourth signal;

transmit on behalf of the system the fourth signal using a third transmission power (TP$_3$) to indicate to other devices of the wireless network receiving the fourth signal to cease communication at least in part until the system has finished communicating with the second device, wherein the fourth signal's transmission power (TP$_3$) is selected to cause the fourth signal not to be received by the second device, the third transmission power (TP$_3$) being a lower transmission power than a fourth transmission power (TP$_4$) to be used by the transceiver to transmit further communication from the system to the second device.

19. The system of claim 17, wherein the system is one selected from the group consisting of a desktop computer, a laptop computer, a set-top box, a personal digital assistant (PDA), a web tablet, a pager, a text messenger, a game device, a smart appliance, and a wireless mobile phone.

* * * * *

UNITED STATES PATENT AND TRADEMARK OFFICE
CERTIFICATE OF CORRECTION

PATENT NO. : 7,787,410 B2  
APPLICATION NO. : 11/443614  
DATED : August 31, 2010  
INVENTOR(S) : Ding et al.

It is certified that error appears in the above-identified patent and that said Letters Patent is hereby corrected as shown below:

In column 9, line 21, "$P1= P2(1+\Delta)^{\alpha}$" should read --$TP1=TP2(1+\Delta)^{\alpha}$--

In column 9, line 23, "where" should read --wherein--

In column 10, line 19, "$P1= P2(1+\Delta)^{\alpha}$" should read --$TP1=TP2(1+\Delta)^{\alpha}$--

In column 10, line 21, "where" should read --wherein--

In column 11, line 14, "$P1= P2(1+\Delta)^{\alpha}$" should read --$TP1=TP2(1+\Delta)^{\alpha}$--

In column 11, line 16, "where" should read --wherein--

Signed and Sealed this

Seventh Day of December, 2010

David J. Kappos  
*Director of the United States Patent and Trademark Office*